(12) United States Patent
Aoki

(10) Patent No.: US 12,231,827 B2
(45) Date of Patent: Feb. 18, 2025

(54) DISPLAY METHOD AND DISPLAY SYSTEM

(71) Applicant: SEIKO EPSON CORPORATION, Tokyo (JP)

(72) Inventor: Yohei Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 62 days.

(21) Appl. No.: 18/122,975

(22) Filed: Mar. 17, 2023

(65) Prior Publication Data

US 2023/0300306 A1    Sep. 21, 2023

(30) Foreign Application Priority Data

Mar. 18, 2022  (JP) ................. 2022-043554

(51) Int. Cl.
| | |
|---|---|
| H04N 9/31 | (2006.01) |
| G06T 3/40 | (2024.01) |
| G06T 7/60 | (2017.01) |
| G06T 7/70 | (2017.01) |
| G06V 40/16 | (2022.01) |
| G09G 5/00 | (2006.01) |

(52) U.S. Cl.
CPC ............ *H04N 9/3188* (2013.01); *G06T 7/60* (2013.01); *G06T 7/70* (2017.01); *H04N 9/3194* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2001/0055058 A1 | 12/2001 | Milovanovic et al. | |
| 2012/0127261 A1 | 5/2012 | Okada | |
| 2014/0244435 A1* | 8/2014 | Yahata | H04N 21/2543 705/26.8 |
| 2014/0362170 A1* | 12/2014 | Walker | H04N 19/147 348/14.08 |

(Continued)

FOREIGN PATENT DOCUMENTS

| | | |
|---|---|---|
| JP | 2002-58004 A | 2/2002 |
| JP | 2009-194498 A | 8/2009 |

(Continued)

OTHER PUBLICATIONS

Artificial Intelligence Research Center, "Anthropometric Database of Japanese Head"; Research Teams_National Institute of Advanced Industrial Science and Technology (AIST); Mar. 2, 2009.

*Primary Examiner* — Hung Q Dang
(74) *Attorney, Agent, or Firm* — Oliff PLC

(57) ABSTRACT

A display method includes: acquiring information representing a size of a projection area of a projector; acquiring an input image including a person; generating information representing a size of a face of the person included in the input image, based on the information representing the size of the projection area; correcting the input image in such a way that the size of the face of the person included in the input image becomes closer to life size in the projection area, based on the information representing the size of the face of the person; generating projection image data representing a projection image including the input image; and displaying the projection image in the projection area, based on the projection image data.

6 Claims, 9 Drawing Sheets

(56) References Cited

U.S. PATENT DOCUMENTS

| | | | | |
|---|---|---|---|---|
| 2018/0091738 A1* | 3/2018 | Takahashi | ............... | H04N 7/14 |
| 2019/0058847 A1* | 2/2019 | Mayer | ................. | G06V 40/165 |
| 2019/0313055 A1* | 10/2019 | Miki | ....................... | G06T 7/70 |
| 2020/0151427 A1* | 5/2020 | Kimura | ................. | G06V 40/18 |

FOREIGN PATENT DOCUMENTS

| | | |
|---|---|---|
| JP | 2011-23886 A | 2/2011 |
| JP | 2019201360 A | 11/2019 |
| JP | 2020167614 A | 10/2020 |
| WO | 2018025458 A1 | 2/2018 |

* cited by examiner

DISPLAY METHOD AND DISPLAY SYSTEM

The present application is based on, and claims priority from JP Application Serial Number 2022-043554, filed Mar. 18, 2022, the disclosure of which is hereby incorporated by reference herein in its entirety.

BACKGROUND

1. Technical Field

The present disclosure relates to a display method and a display system.

2. Related Art

JP-A-2020-167614 discloses a remote communication device that projects the whole body of a person onto a screen having a diagonal size of 80 inches or more and thus gives a viewer an impression that this person is displayed in life size. Recently, various display devices are expected to be utilized as a remote communication device. In this case, the size of a screen where a person is displayed, that is, the size of a display area, varies depending on the display device used. The remote communication device described in JP-A-2020-167614 cannot give a viewer an impression that a person is displayed in life size via various display devices with display areas of different sizes.

SUMMARY

According to an aspect of the present disclosure, a display method includes: acquiring information representing a size of a display area of a display device; acquiring an input image including a person; generating information representing a size of a face of the person included in the input image, based on the information representing the size of the display area; correcting the input image in such a way that the size of the face of the person included in the input image becomes closer to life size in the display area, based on the information representing the size of the face of the person; generating first image data representing a first image including the input image; and displaying the first image in the display area, based on the first image data.

According to another aspect of the present disclosure, a display system includes a processing device generating first image data representing a first image, and a display device displaying the first image in a display area, based on the first image data. The processing device executes: acquiring information representing a size of the display area; acquiring an input image including a person; generating information representing a size of a face of the person included in the input image, based on the information representing the size of the display area; correcting the input image in such a way that the size of the face of the person included in the input image becomes closer to life size in the display area, based on the information representing the size of the face of the person; and generating the first image data representing the first image including the input image.

DESCRIPTION OF EXEMPLARY EMBODIMENTS

An embodiment described below includes various technically preferable limitations. However, the embodiment of the present disclosure is not limited to the form described below.

1. Embodiment

Figure 1:
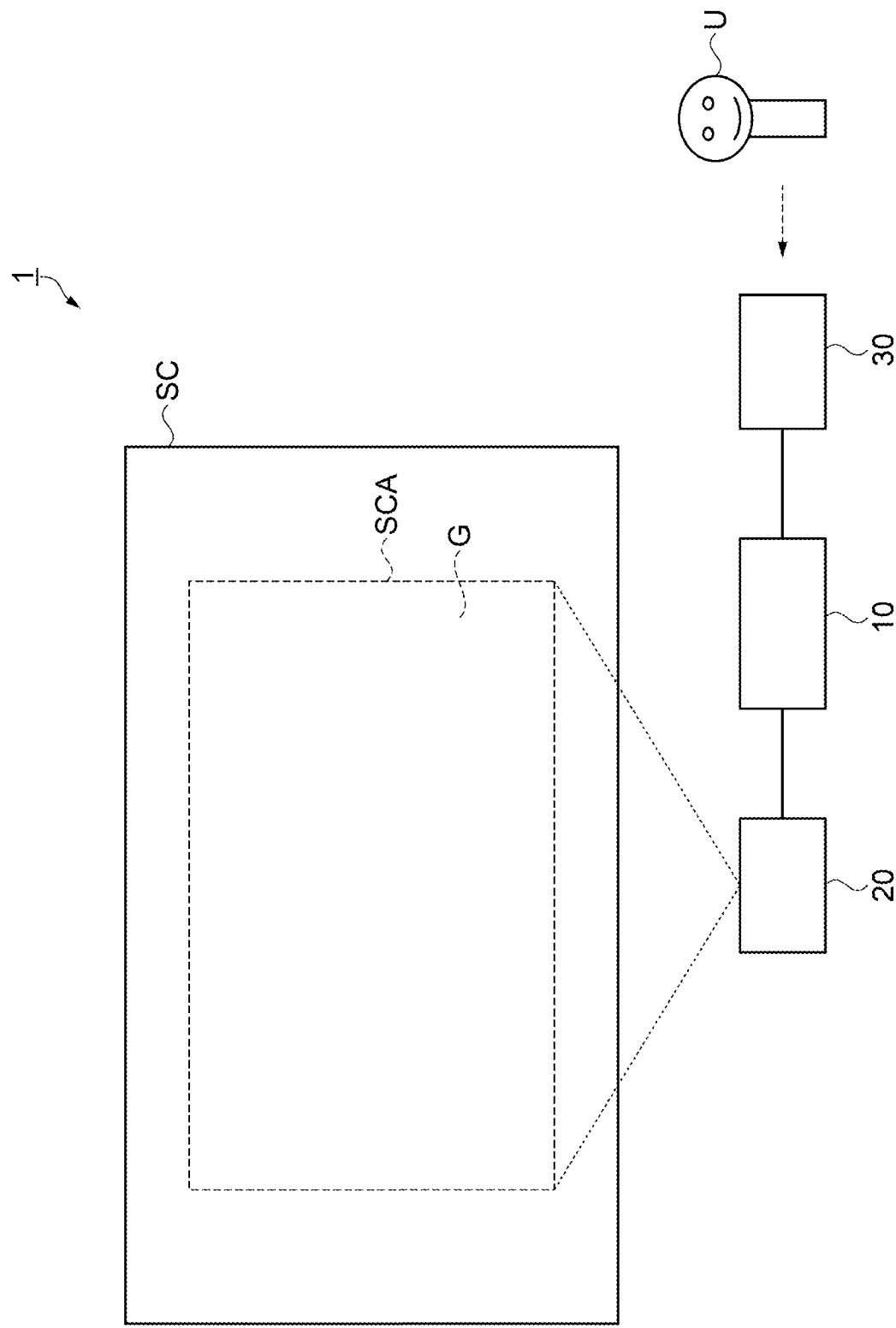
FIG. 1 shows an example of the configuration of a display system according to an embodiment of the present disclosure.

FIG. 1 shows an example of the configuration of a display system 1 according to one embodiment of the present disclosure. As shown in FIG. 1, the display system 1 has an image supply device 10, a projector 20, and a camera 30. The image supply device 10 is connected to the projector 20 via wired communication. The image supply device 10 is also connected to the camera 30 via wired communication. The form of communication between the image supply device 10, and the projector 20 and the camera 30, is not limited to wired communication and may be wireless communication.

The display system 1 according to the one embodiment of the present disclosure is a system for carrying out a teleconference and communicates with a remote display system 2 (see FIG. 2) connected to the display system 1 via a network. To describe this more in detail, the image supply device 10 provided in the display system 1 is connected to an image supply device 11 provided in the remote display system 2 via wireless network communication. The form of communication between the image supply device 10 and the image supply device 11 is not limited to wireless network communication and may be wired network communication.

Figure 2:
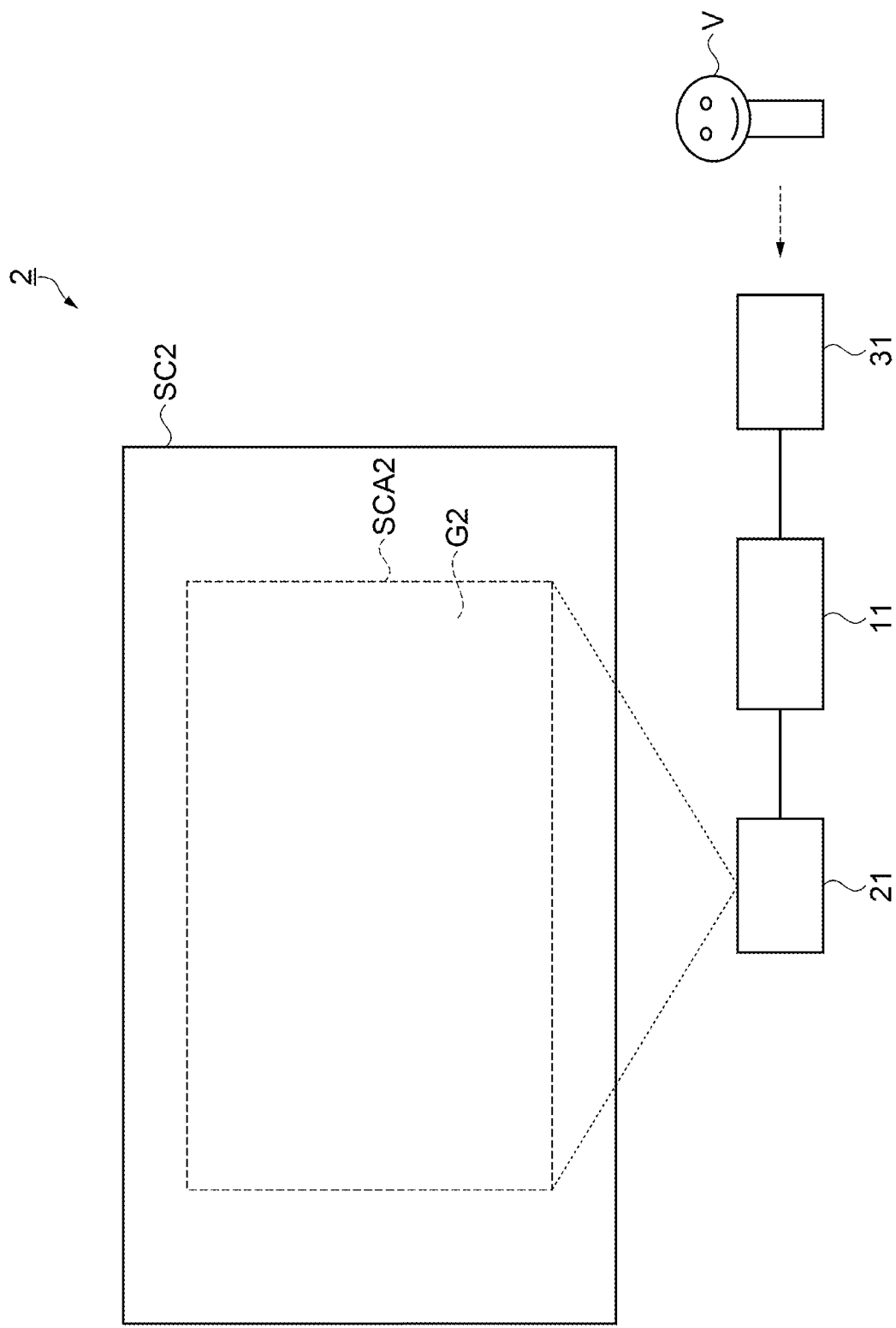
FIG. 2 shows an example of the configuration of a remote display system according to the embodiment of the present disclosure.

FIG. 2 shows an example of the configuration of the remote display system 2. As shown in FIG. 2, the remote display system 2 has the image supply device 11, a projector 21, and a camera 31, similarly to the display system 1. The image supply device 11 is configured similarly to the image supply device 10. The projector 21 is configured similarly to the projector 20. The camera 31 is configured similarly to the camera 30. Also, the connection between the image supply device 11 and the projector 21 and the connection between the image supply device 11 and the camera 31 are similar to those in the display system 1.

As shown in FIGS. 1 and 2, the image supply device 10 receives input image data representing an input image I received from the remote display system 2, as described in detail later. The image supply device 10 also supplies projection image data generated based on the received input image data, to the projector 20. The image supply device 10 also transmits a picked-up image from the camera 30, described later, to the image supply device 11 provided in the remote display system 2.

The projector 20 projects a projection image G based on the projection image data supplied from the image supply device 10, onto a screen SC. As shown in FIG. 1, an area where the projection image G is projected on the screen SC is a projection area SCA. In FIG. 1, the projection area SCA is an area indicated by dashed lines. The projector 20 is an example of a display device. The projection area SCA is an example of a display area.

The display device may be any device that can display an image based on image data supplied from the image supply device 10 and is not limited to the projector 20. The display device may be, for example, a self-light-emitting display device such as a liquid crystal display device displaying an image on a liquid crystal display panel or an organic EL display device displaying an image on an organic EL panel. In this case, the display area may be an area on a display panel provided in the display device.

The camera 30 acquires a picked-up image formed by picking up an image of an area including the face of a user U using the display system 1, and transmits the picked-up image to the image supply device 10. As the picked-up image picked up by the camera 30 is transmitted to the remote display system 2 by the image supply device 10, the remote display system 2 projects a projection image G2 generated based on the picked-up image including the face of the user U, onto a screen SC2 from the projector 21, and thus displays the projection image G2 in a projection area SCA2 on the screen SC2.

The remote display system 2, similarly to the display system 1, acquires a picked-up image formed by the camera 31 picking up an image of an area including the face of a user V using the remote display system 2. The picked-up image formed by picking up the image of the area including the face of the user V is transmitted as the foregoing input image I to the image supply device 10. Specifically, input image data representing the input image I is transmitted to the image supply device 10. In other words, the input image data is image data representing the input image I including the user V, that is, a person.

As described in detail later, based on the size of the projection area SCA, the image supply device 10 enlarges or reduces the input image I based on the input image data received from the remote display system 2. The image supply device 10 causes the projector 20 to project the projection image G based on the projection image data including the enlarged or reduced input image I, in the projection area SCA, and thus causes the face of the user V included in the input image I to be displayed in a size close to life size.

Figure 3:
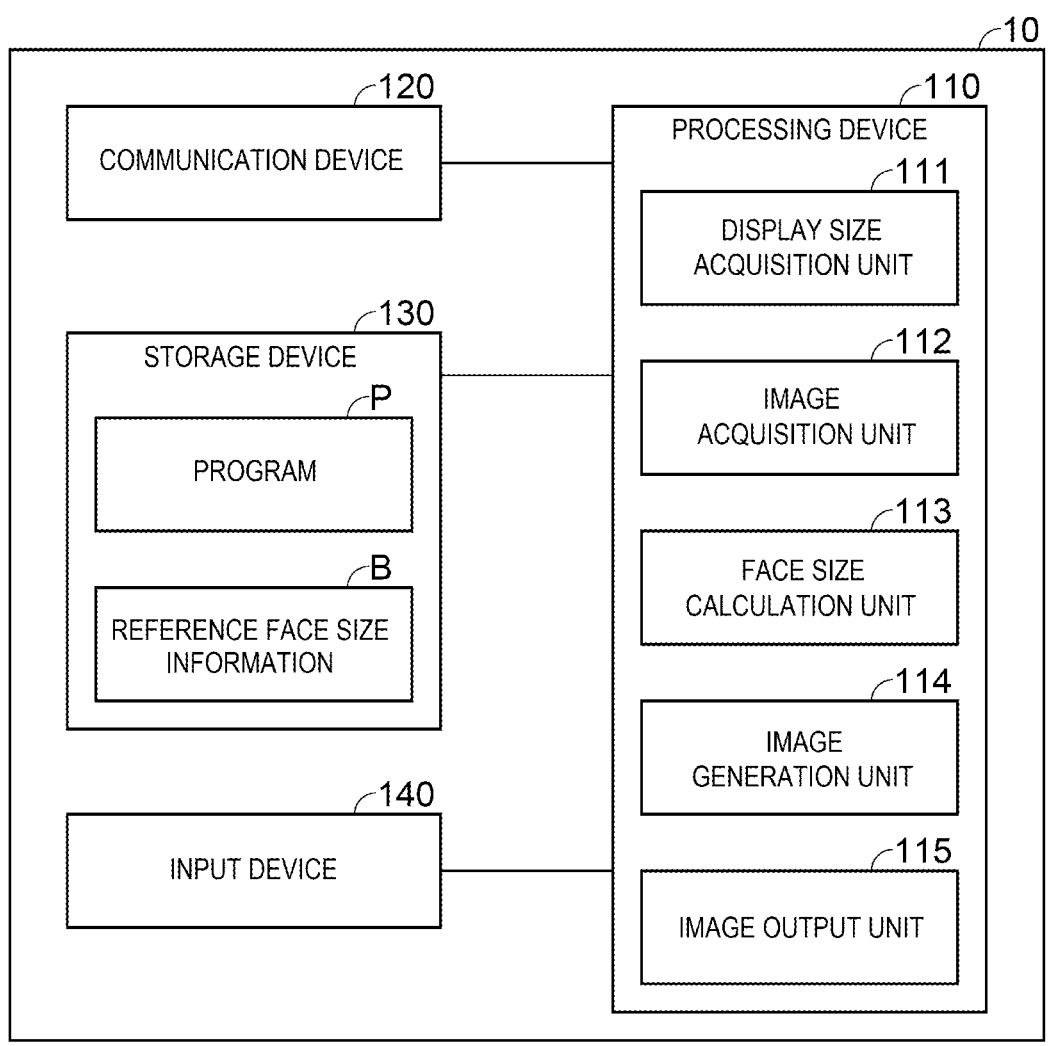
FIG. 3 shows an example of the configuration of an image supply device according to the embodiment of the present disclosure.

FIG. 3 shows an example of the configuration of the image supply device 10. The image supply device 10 is a device transmitting generated projection image data to the projector 20 and may be, for example, a personal computer. As shown in FIG. 3, the image supply device 10 includes a processing device 110, a communication device 120, a storage device 130, and an input device 140. The input device 140 is, for example, a keyboard or a mouse. The processing device 110 is one or more processors and is, for example, a CPU (central processing unit) The processing device 110 operates according to various programs stored in the storage device 130 and thus controls the image supply device 10.

The communication device 120 is a device performing wireless communication or wired communication with another device and has, for example, an interface circuit. As a specific example of another device communicating with the communication device 120, the projector 20, the camera 30, and the image supply device 11 of the remote display system 2 supplying input image data to the image supply device 10 may be employed. The communication device 120 receives input image data from the image supply device 11 provided in the remote display system 2. The communication between the communication device 120 and another device may be, for example, wired communication via a communication line such as a USB (Universal Serial Bus) cable or a LAN (local area network) cable or may be wireless communication via a wireless communication network such as a wireless LAN.

The storage device 130 is a recording medium readable by the processing device 110. The storage device 130 includes, for example, a non-volatile memory and a volatile memory. The non-volatile memory is, for example, a ROM (read-only memory), an EPROM (erasable programmable read-only memory) or an EEPROM (electrically erasable programmable read-only memory). The volatile memory is, for example, a RAM (random-access memory). In the non-volatile memory of the storage device 130, various programs including a program P, and reference face size information B, described later, are stored. The volatile memory of the storage device 130 is used by the processing device 110 as a work area for executing various programs.

As an example of the various programs stored in the non-volatile memory, a kernel program, not illustrated, and the program P may be employed. The kernel program is a program for causing the processing device 110 to implement an OS (operating system). The processing device 110 reads out the kernel program from the non-volatile memory to the volatile memory in response to the turning on of the power of the image supply device 10 and starts executing the kernel program thus read out. The processing device 110 operating according to the kernel program starts executing another program, for example, in response to an instruction to start executing this another program given by an operation performed by the user U to the input device 140.

For example, when an instruction to start executing the program P is given by an operation to the input device 140, the processing device 110 reads out the program P from the non-volatile memory to the volatile memory and starts executing the program P readout into the volatile memory. The processing device 110 operating according to the program P functions as a display size acquisition unit 111, an image acquisition unit 112, a face size calculation unit 113, an image generation unit 114, and an image output unit 115. That is, each of the display size acquisition unit 111, the image acquisition unit 112, the face size calculation unit 113, the image generation unit 114, and the image output unit 115 is a software module implemented by causing the processing device 110 to operate according to the program P. The role of each of the display size acquisition unit 111, the image acquisition unit 112, the face size calculation unit 113, the image generation unit 114, and the image output unit 115 is described below.

The display size acquisition unit 111 acquires the size of the projection area SCA where the projector 20 projects the projection image G on the screen SC, and acquires the PPI (pixels per inch) of the projection image G on the screen SC, based on the acquired size of the projection area SCA. The size of the projection area SCA is an example of the size of the display area. The PPI of the projection image G on the screen SC is an example of information representing the size of the display area.

The display size acquisition unit 111 acquires the size of the projection area SCA via an operation performed by the user U to the input device 140. To describe this more in detail, the user U actually measures, on the screen SC, the length of a diagonal line of the projection area SCA, which is substantially rectangular, and inputs the actually measured length of the diagonal line as the size of the projection area SCA to the image supply device 10 by an operation to the input device 140. The display size acquisition unit 111 acquires the length of the diagonal line whose input is accepted from the user U, as the size of the projection area SCA.

The display size acquisition unit 111 may be configured to cause the user U to input the lengths of at least two sides intersecting each other, of the four sides forming the projection area SCA, as the size of the projection area SCA. In this case, if the projection area SCA is regarded as a rectangle, a right-angled triangle where the diagonal line of the projection area SCA is the hypotenuse, one of the inputted two sides is the opposite side, and the other is the adjacent side, can be defined. In this case, the length of the diagonal line of the projection area SCA, which is the hypotenuse of the right-angled triangle, can be calculated based on the inputted lengths of the two sides, using the known Pythagorean theorem.

The display size acquisition unit 111 may also measure the length of the diagonal line of the projection area SCA on the screen SC, using a distance measuring device, not illustrated. In this case, the distance measuring device measures the three-dimensional coordinate values of the positions on the screen SC, of a start point and an end point of a line segment that is the diagonal line of the projection area SCA, and calculates the length of the diagonal line of the projection area SCA, based on the three-dimensional coordinate values.

The distance measuring device may be any distance measuring device that can find the three-dimensional coordinate values of the positions on the screen SC of the start point and the end point. For example, a stereo camera system formed of two cameras, or a depth camera can be used. As the depth camera, for example, a LiDAR (light detection and ranging) sensor using a ToF (time of flight) method or the like can be used. The three-dimensional coordinate values of the positions on the screen SC of the start point and the end point correspond to the three-dimensional coordinate values where the display area is located.

The display size acquisition unit 111 may use a stereo camera system using the projector 20 and the camera 30, as the distance measuring device. In this case, the camera 30 is arranged in such a way that the screen SC fits within the image pickup range. The positional relationship between the projector 20 and the camera 30 is assumed to be already measured and known.

When using the stereo camera using the projector 20 and the camera 30, the display size acquisition unit 111 first acquires, from the projector 20, a picked-up image formed by the camera 30 picking up an image of a state where a known pattern image is projected on the screen SC. The display size acquisition unit 111 then analyzes the picked-up image and thus acquires the correspondence relationship between a picked-up image coordinate system representing a position on the picked-up image picked up by the camera 30 and a projector coordinate system representing a position on the projection image G from the projector 20. The pattern image may be any pattern image having a detectable feature in the image. For example, a gray code pattern image, a phase shift pattern image, or a checkered pattern image can be used. The pattern image is an example of an image for measurement.

Next, the display size acquisition unit 111 converts each pixel coordinate value forming the picked-up image picked up by the camera 30 into the projector coordinate system, by using this correspondence relationship, and thus generates a picked-up image as picked up from the position of the projector. Finally, the display size acquisition unit 111 calculates the three-dimensional coordinate values of the positions on the screen SC of the start point and the end point, similarly to the known stereo camera system, by using the positional relationship between the projector 20 and the camera 30, the generated picked-up image, and the picked-up image picked up by the camera 30. Also, a camera, not illustrated, that is different from the camera 30 may be used instead of the camera 30.

The display size acquisition unit 111 calculates the PPI of the projection image G on the screen SC, based on the length of the diagonal line of the projection area SCA decided based on the calculated three-dimensional coordinate values. The PPI can be calculated by the following equation (1), where n is the number of pixels in the horizontal direction of the projection image G, that is, in the x-axis direction, m is the number of pixels in the vertical direction, that is, in the y-axis direction, and s is the length of the diagonal line of the projection area SCA.

$$PPI = \frac{\sqrt{n^2 + m^2}}{s} \quad (1)$$

The display size acquisition unit 111 substitutes the numbers of pixels in the horizontal direction and the vertical direction of the projection image G and the length of the diagonal line of the projection area SCA into the equation (1) and thus acquires the PPI of the projection image G on the screen SC. The unit of the length s of the diagonal line is the inch. The numbers of pixels in the horizontal direction and the vertical direction of the projection image G are set in advance by an operation to the input device 140 performed by the user U. The set numbers of pixels in the horizontal direction and the vertical direction of the projection image G may be stored in the storage device 130.

The image acquisition unit 112 controls the communication device 120 and thus acquires input image data representing the input image I including a person. The input image I including a person is a picked-up image formed by the camera 31 at a remote location picking up an image of the user V, who is the person. The person included in the input image I is not limited to a real person whose image is picked up by the camera 31. For example, an image including an avatar with a face, expressed by two-dimensional or three-dimensional computer graphics, may be acquired as the input image I. The user V, who is the person included in the picked-up image, and the avatar with a face, are an example of the person.

The face size calculation unit 113 analyzes the input image data acquired by the image acquisition unit 112 and calculates the size of the face of the person included in the input image I on the projection area SCA when the input image I is projected in the projection area SCA by the projector 20.

To describe this more in detail, the face size calculation unit 113 first detects the position of a left eye EL and the position of a right eye ER in the face of the person included in the input image I, using a known machine learning system. The position of the left eye EL is, for example, the centroid position of the pupil included in the left eye EL. Similarly, the position of the right eye ER is, for example, the centroid position of the pupil included in the right eye ER.

Figure 4:
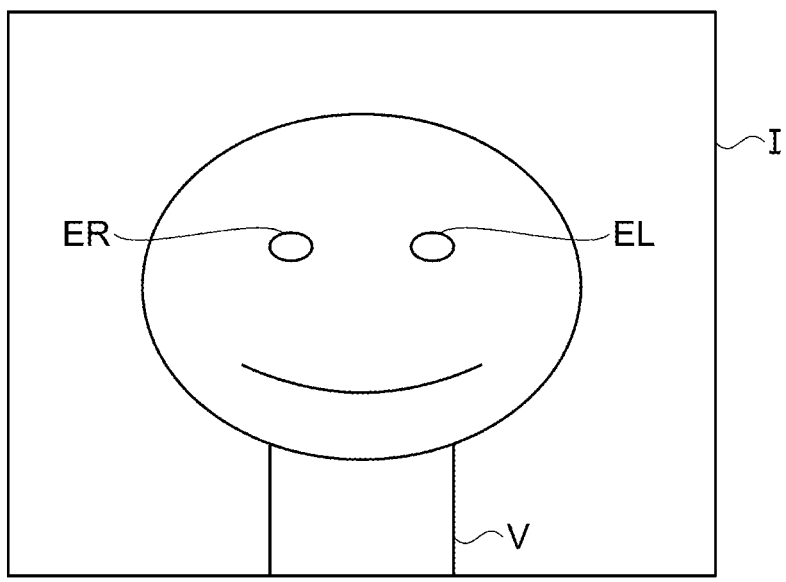
FIG. 4 shows an example of an input image.

FIG. 4 shows an example of the input image I. The input image I is an image of the user V captured by the camera 31 provided in the remote display system 2. As shown in FIG. 4, the input image I includes an image showing the user V and the left eye EL and the right eye ER of the user V.

Next, the face size calculation unit 113 calculates the distance between the position of the left eye EL and the position of the right eye ER detected in the input image I. From now on, the distance between the position of the left eye EL and the position of the right eye ER is referred to as an interpupillary distance. The interpupillary distance in the input image I is expressed by the number of pixels. The detected position of the left eye EL is an example of a first position. The detected position of the right eye ER is an example of a second position.

Next, the face size calculation unit 113 converts the interpupillary distance in the input image I expressed by the number of pixels into an interpupillary distance expressed by inches, using the PPI of the projection image G calculated by the display size acquisition unit 111. The interpupillary distance converted into inches is acquired as the size of the face of the person included in the input image I in the projection area SCA. The interpupillary distance converted into inches is an example of information representing the size of the face of a person included in the input image in the display area, and a first distance. From now on, the interpupillary distance converted into inches is referred to as a calculated value of the interpupillary distance.

The face size calculation unit 113 is assumed to detect the position of the left eye EL and the position of the right eye ER in the face of the person included in the input image I, using a known machine learning system. However, this is not limiting. For example, the face size calculation unit 113 may detect the position of the left eye EL and the position of the right eye ER, using known template matching processing. The face size calculation unit 113 may be able to detect at least the position of the left eye EL and the position of the right eye ER in the face of the person included in the input image I.

The face size calculation unit 113 is assumed to detect the position of the left eye EL and the position of the right eye ER in the face of the person included in the input image I. However, this is not limiting. The face size calculation unit 113 may detect a region of the face of the person included in the input image I. In this case, the area of the region detected as the region of the face of the person may be acquired as the information representing the size of the face of the person included in the input image I.

The image generation unit 114 enlarges or reduces the size of the input image I in such a way that the size of the face of the person included in the input image I in the projection area SCA, calculated by the face size calculation unit 113, becomes closer to the size of the face of the person in life size. The image generation unit 114 also generates projection image data representing the projection image G including the enlarged or reduced input image I. The processing of enlarging or reducing the size of the input image I is an example of correcting the input image I.

Figure 5:
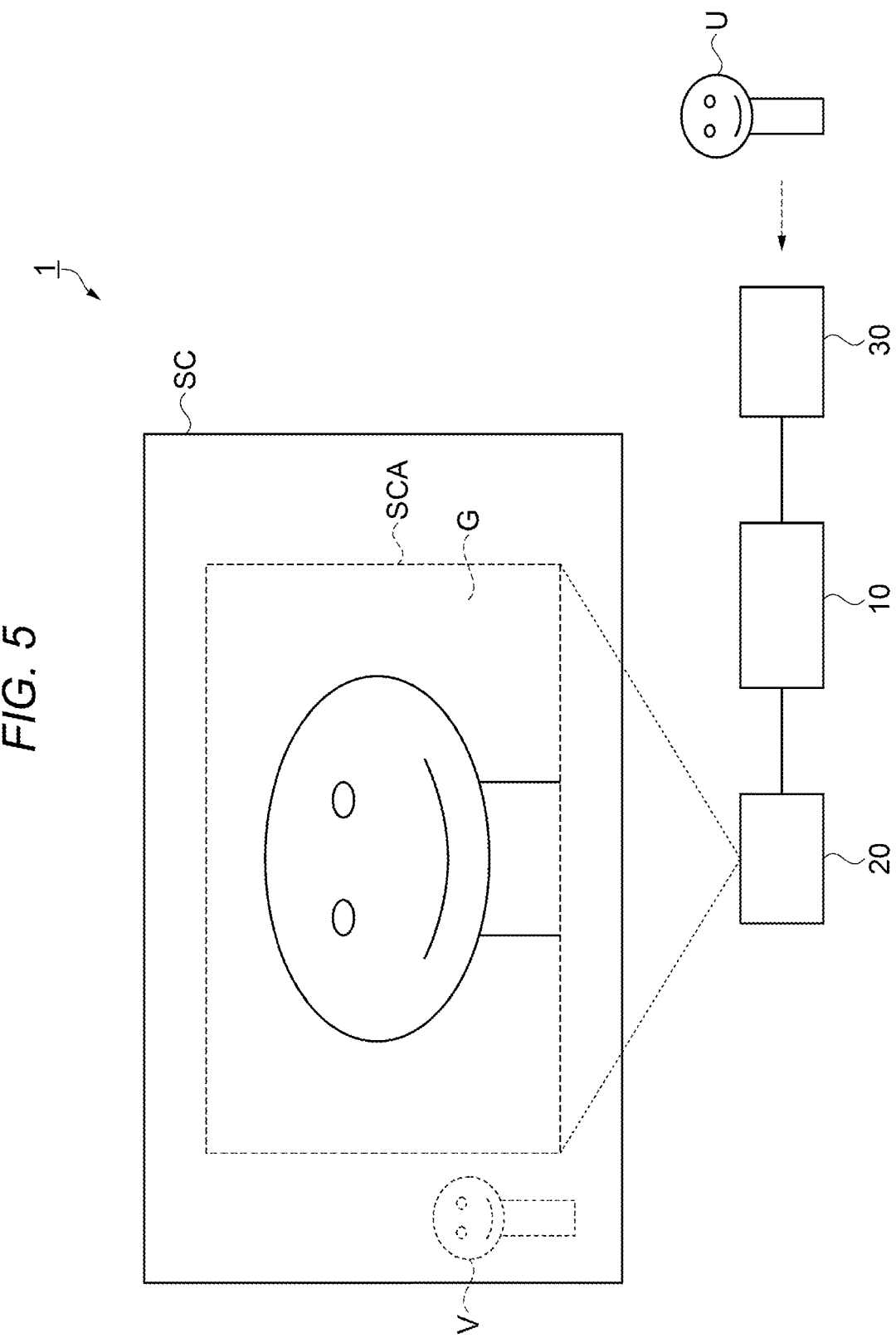
FIG. 5 shows an example of a case where a projection image that does not take the size of the face of a person in life size into account is displayed in a projection area.

FIG. 5 shows an example of a case where the projection image G that does not take the size of the face of the person in life size into account is displayed in the projection area SCA. In FIG. 5, the projector 20 projects, as the projection image G, the input image I as shown in FIG. 4 received from the remote display system 2 onto the screen SC and thus displays the projection image G in the projection area SCA. In FIG. 5, the user V in life size is indicated by dashed lines for comparison of the sizes.

In the display system 1, the size of the projection area SCA changes according to the type of the display device used and the size and the position of installation of the screen SC. Therefore, when the input image I based on the input image data received from the remote display system 2 is projected directly as the projection image G from the projector 20, there is a risk that the user V included in the projection image G may be displayed in a different size from life size, as shown in FIG. 5.

Figure 6:
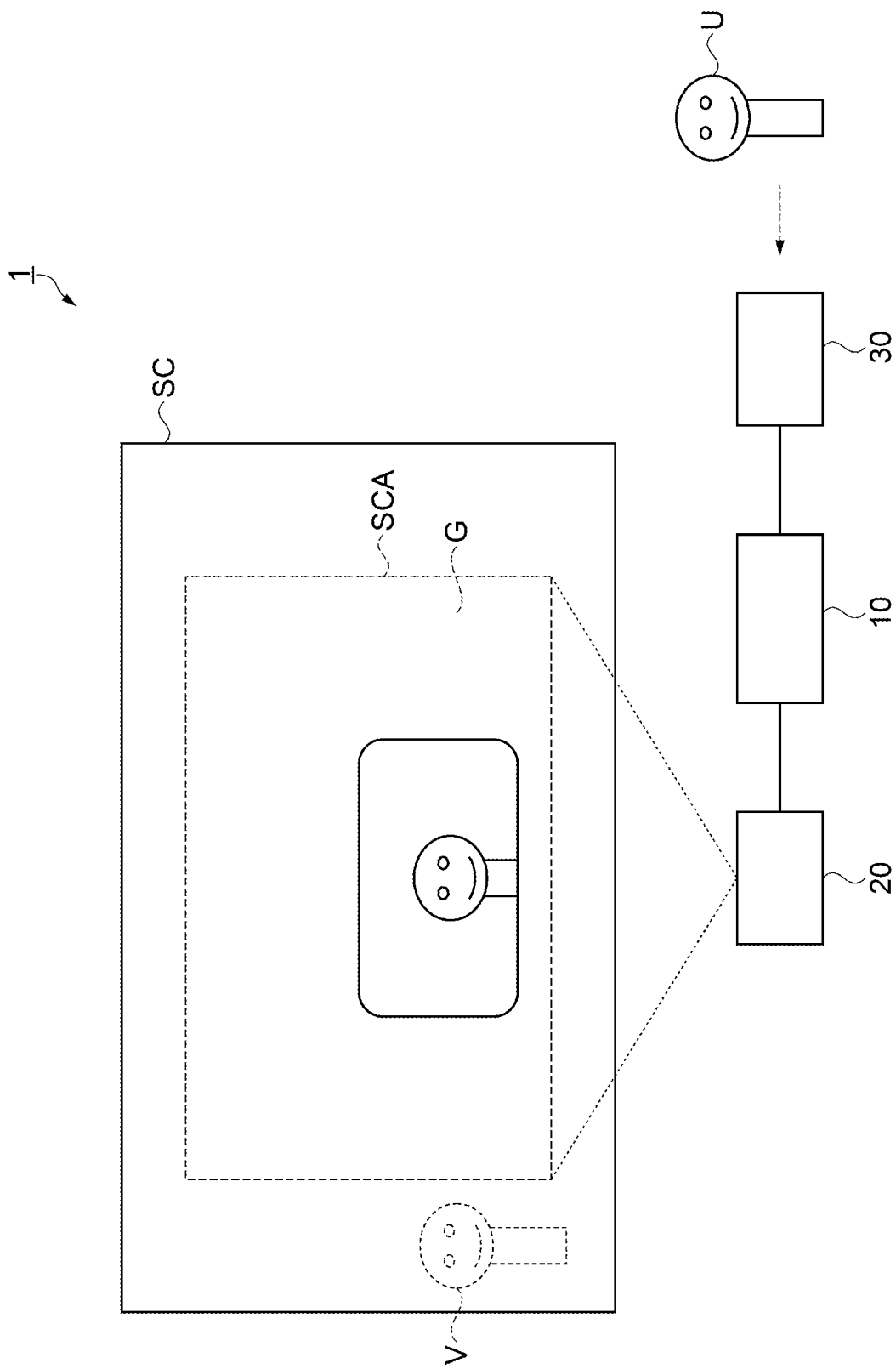
FIG. 6 shows an example of a case where a projection image taking the size of the face of a person in life size into account is projected in the projection area.

Meanwhile, FIG. 6 shows an example of a case where the projection image G taking the size of the face of the person in life size into account is displayed in the projection area SCA. In FIG. 6, the input image I as shown in FIG. 4 received from the remote display system 2 is enlarged or reduced by the image generation unit 114 in such a way that the size of the face of the person in the projection area SCA becomes closer to the size of the face of the person in life size, and the projector 20 projects the projection image G including this input image I onto the screen SC and thus displays the projection image G in the projection area SCA. In FIG. 6, as in FIG. 5, the user V in life size is indicated by dashed lines for comparison of the sizes.

As shown in FIG. 6, as a result of the processing by the image generation unit 114, the face of the user V included in the projection image G is displayed in a size close to life size, in the projection area SCA.

The processing by the image generation unit 114 will now be described in detail. First, the image generation unit 114 reads out reference face size information B stored in the storage device 130. The reference face size information B includes information about the size of the face of the person in life size. Specifically, the reference face size information B includes a reference value of the interpupillary distance of the person in life size. The unit of the reference value of the interpupillary distance is the inch. The reference value of the interpupillary distance is, for example, 2.5 inches. Here, 2.5 inches is the average value of actually measured values of the interpupillary distance of Japanese people aged 18 to 34. The reference value of the interpupillary distance is not limited to 2.5 inches and another value may be used. The information about the size of the face of the person in life size included in the reference face size information B, that is, the reference value of the interpupillary distance, is an example of a second distance.

Next, the image generation unit 114 compares a first threshold greater than the reference value of the interpupillary distance included in the reference face size information B, with the calculated value of the interpupillary distance calculated by the face size calculation unit 113. The first threshold is, for example, 3.0 inches. When the calculated value of the interpupillary distance is equal to or greater than the first threshold, the image generation unit 114 reduces the size of the input image I in such a way that the calculated value of the interpupillary distance becomes closer to the reference value of the interpupillary distance. For example, the image generation unit 114 may reduce the size of the input image I in such a way that the calculated value of the interpupillary distance coincides with the reference value of the interpupillary distance.

When the calculated value of the interpupillary distance is smaller than the first threshold, the image generation unit 114 compares a second threshold smaller than the reference value of the interpupillary distance with the calculated value of the interpupillary distance. The second threshold is, for example, 2.0 inches.

When the calculated value of the interpupillary distance is greater than the second threshold, the image generation unit 114 determines that the calculated value of the interpupillary distance is substantially the same as the reference value of the interpupillary distance, and therefore does not perform the processing of enlarging or reducing the input image I. In this case, the image generation unit 114 generates projection image data representing the projection image G including the input image I that is not enlarged or reduced.

When the calculated value of the interpupillary distance is equal to or smaller than the second threshold, the image generation unit 114 determines whether the projection area SCA is an area having a sufficient projection area size to display the face of the person in life size or not. To describe this more in detail, the image generation unit 114 compares a third threshold representing the size of a projection area where the face of the person in life size can be displayed, with the length of the diagonal line of the projection area SCA representing the size of the projection area SCA. The third threshold is, for example, 15.0 inches.

When the calculated value of the interpupillary distance is equal to or smaller than the second threshold and the length of the diagonal line of the projection area SCA is equal to or longer than the third threshold, the image generation unit 114 enlarges the size of the input image I in such a way that the calculated value of the interpupillary distance becomes closer to the reference value of the interpupillary distance. If the length of the diagonal line of the projection area SCA is equal to or longer than the third threshold, the size of the projection area SCA is large enough to display the face of the person in life size. Therefore, the size of the input image I can be enlarged in such a way that the calculated value of the interpupillary distance becomes closer to the reference value of the interpupillary distance. For example, the image generation unit 114 may enlarge the size of the input image I in such a way that the calculated value of the interpupillary distance coincides with the reference value of the interpupillary distance.

Meanwhile, when the calculated value of the interpupillary distance is equal to or smaller than the second threshold and the length of the diagonal line of the projection area SCA is shorter than the third threshold, the image generation unit 114 enlarges the size of the input image I in such a way that the calculated value of the interpupillary distance becomes closer to a third distance shorter than the reference value of the interpupillary distance. The third distance is, for example, a length that is one-sixth the length of the diagonal line of the projection area SCA.

If the length of the diagonal line of the projection area SCA is shorter than the third threshold, it is determined that the size of the projection area SCA is not a size that can display the face of the person in life size. Therefore, the face of the person cannot be displayed in life size without extending beyond the projection area SCA. In other words, the size of the input image I cannot be enlarged in such a way that the calculated value of the interpupillary distance becomes closer to the reference value of the interpupillary distance. Therefore, the size of the input image I is enlarged in such a way that the calculated value of the interpupillary distance becomes closer to the third distance shorter than the reference value of the interpupillary distance. For example, the size of the input image I may be enlarged in such a way that the calculated value of the interpupillary distance coincides with the third distance. Also, a configuration where the correction based on the calculated value of the interpupillary distance is not made to the input image I when the calculated value of the interpupillary distance is equal to or smaller than the second threshold and the length of the diagonal line of the projection area SCA is shorter than the third threshold, may be employed.

When enlarging or reducing the size of the input image I, the value of the difference between the calculated value of the interpupillary distance and the reference value of the interpupillary distance may be converted into the number of pixels, based on the PPI of the projection image G calculated by the display size acquisition unit 111, and the input image I may be enlarged or reduced, based on the ratio of the interpupillary distance in the input image I to the value of the difference converted into the number of pixels.

Next, the image generation unit 114 generates projection image data representing the projection image G including the enlarged or reduced input image I. The projection image G may include at least the person included in the enlarged or reduced input image I. For example, the projection image G may include an image trimmed in such a way that an area including the person is left, of the enlarged or reduced input image I. In the case of trimming the enlarged or reduced input image I, for example, the image may be trimmed in such a way that the aspect ratio of the input image I becomes closer to the aspect ratio of the projection area SCA. Also, the projection image G may include at least the person included in the input image I and may be a composite image including another image.

The image output unit 115 controls the communication device 120 and thus outputs the projection image data generated by the image generation unit 114 to the projector 20. The projection image G based on the projection image data is an example of a first image. The projection image data is an example of first image data.

Figure 7:
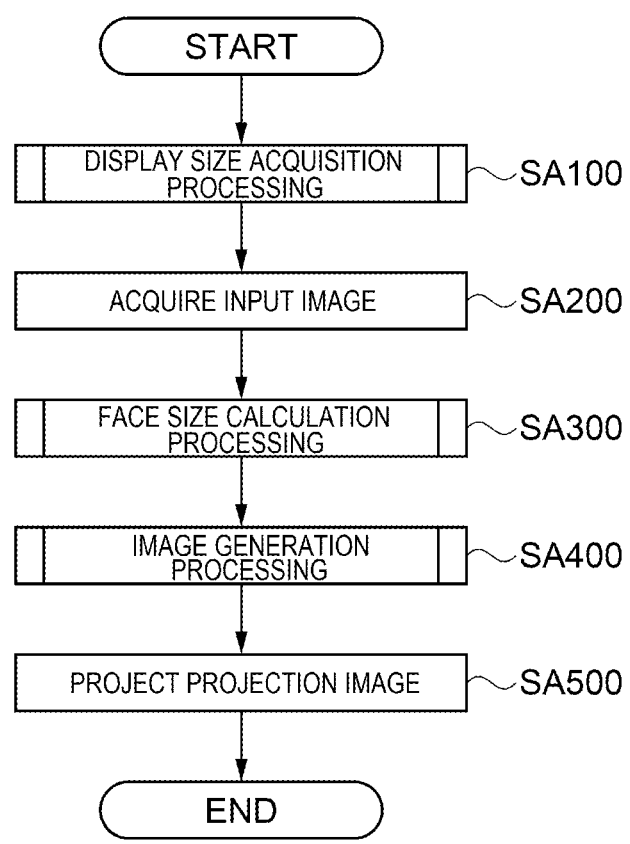
FIG. 7 is a flowchart showing a flow of a display method executed by a processing device of the image supply device according to a program.

FIG. 7 is a flowchart showing a flow of a display method executed by the processing device 110 operating according to the program P. As shown in FIG. 7, this display method includes processing of steps SA100 to SA500.

Figure 8:
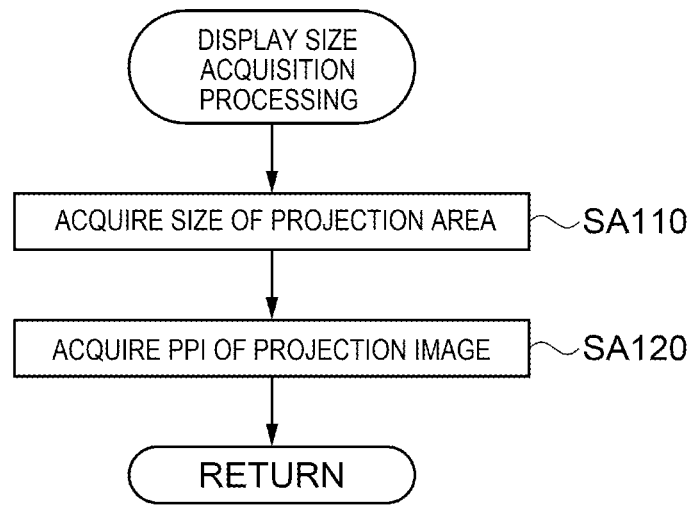
FIG. 8 is a flowchart showing a flow of display size acquisition processing.

In step SA100, the processing device 110 functions as the display size acquisition unit 111. In step SA100, the processing device 110 executes display size acquisition processing. FIG. 8 is a flowchart showing the flow of the display size acquisition processing. As shown in FIG. 8, the display size acquisition processing includes processing of steps SA110 and SA120.

In step SA110, the processing device 110 acquires the length of the diagonal line of the projection area SCA as the size of the projection area SCA by an operation to the input device 140 performed by the user U.

In step SA120 following step SA110, the processing device 110 calculates the PPI of the projection image G, using the length of the diagonal line of the projection area SCA acquired by the operation accepted from the user U and the numbers of pixels in the horizontal direction and the vertical direction of the projection image G set in advance by the user U.

On completion of the processing of step SA120, the display size acquisition processing ends and the processing shifts to step SA200. In step SA200, the processing device 110 functions as the image acquisition unit 112. In step SA200, the processing device 110 controls the communication device 120, thus receives input image data, and acquires the input image I.

Figure 9:
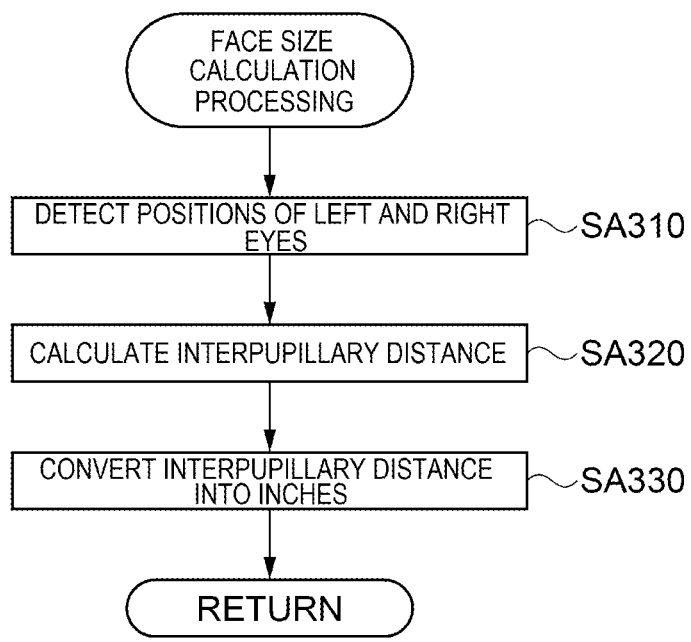
FIG. 9 is a flowchart showing a flow of face size calculation processing.

In step SA300 following step SA200, the processing device 110 functions as the face size calculation unit 113. In step SA300, the processing device 110 executes face size calculation processing. FIG. 9 is a flowchart showing the flow of the face size calculation processing. As shown in FIG. 9, the face size calculation processing includes processing of steps SA310 to SA330.

In step SA310, the processing device 110 detects the position of the left eye EL and the position of the right eye ER included in the face of a person included in the input image I.

In step SA320 following step SA310, the processing device 110 calculates the interpupillary distance in the input image I, based on the position of the left eye EL and the position of the right eye ER that are detected.

In step SA330 following step SA320, the processing device 110 acquires a calculated value of the interpupillary distance by converting the calculated interpupillary distance in the input image I into inches as the unit, based on the PPI of the projection image G calculated in step SA120.

Figure 10:
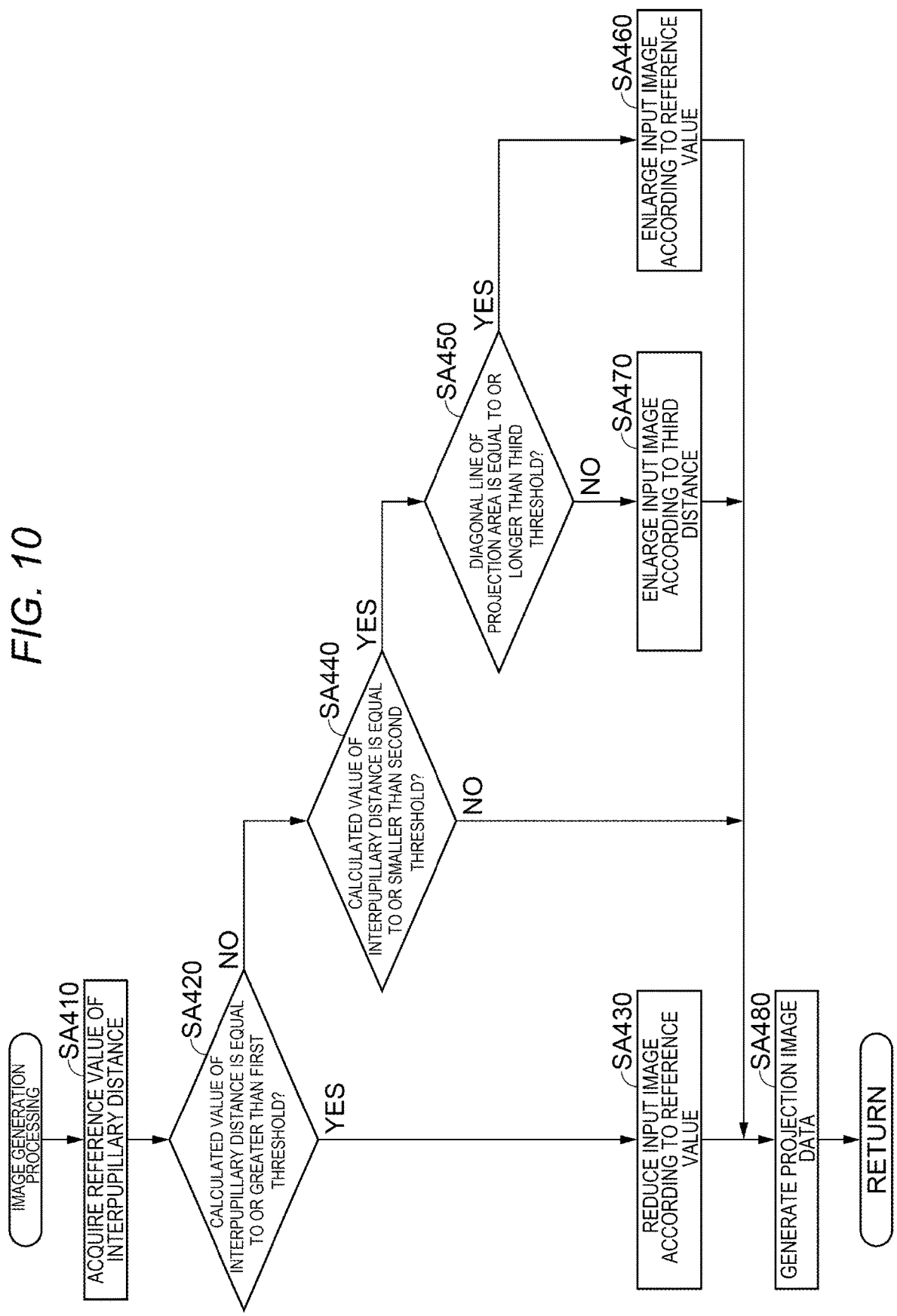
FIG. 10 is a flowchart showing a flow of image generation processing.

On completion of the processing of step SA330, the face size calculation processing ends and the processing shifts to step SA400. In step SA400, the processing device 110 functions as the image generation unit 114. In step SA400, the processing device 110 executes image generation processing. FIG. 10 is a flowchart showing the flow of the image generation processing. As shown in FIG. 10, the image generation processing includes processing of steps SA410 to SA480.

In step SA410, the processing device 110 reads out the reference face size information B from the storage device 130 and acquires the reference value of the interpupillary distance of the person in life size.

In step SA420, the processing device 110 determines whether the calculated value of the interpupillary distance acquired in step SA330 is equal to or greater than the first threshold or not. When the calculated value of the interpupillary distance is equal to or greater than the first threshold (YES in step SA420), the processing device 110 shifts to step SA430.

In step SA430, the processing device 110 reduces the size of the input image I in such a way that the calculated value of the interpupillary distance becomes closer to the reference value of the interpupillary distance. The processing device 110 then shifts to step SA480.

Meanwhile, when the calculated value of the interpupillary distance is smaller than the first threshold (NO in step SA420), the processing device 110 shifts to step SA440.

In step SA440, the processing device 110 determines whether the calculated value of the interpupillary distance is equal to or smaller than the second threshold or not. When the calculated value of the interpupillary distance is greater than the second threshold (NO in step SA440), the processing device 110 shifts to step SA480 without enlarging or reducing the input image I.

Meanwhile, when the calculated value of the interpupillary distance is equal to or smaller than the second threshold (YES in step SA440), the processing device 110 shifts to step SA450.

In step SA450, the processing device 110 determines whether the length of the diagonal line of the projection area SCA acquired in step SA110 is equal to or longer than the third threshold or not. When the length of the diagonal line of the projection area SCA is equal to or longer than the third threshold (YES in step SA450), the processing device 110 shifts to step SA460.

In step SA460, the processing device 110 enlarges the size of the input image I in such a way that the calculated value of the interpupillary distance becomes closer to the reference value of the interpupillary distance. The processing device 110 then shifts to step SA480.

Meanwhile, when the length of the diagonal line of the projection area SCA is shorter than the third threshold (NO in step SA450), the processing device 110 shifts to step SA470.

In step SA470, the processing device 110 enlarges the size of the input image I in such a way that the calculated value of the interpupillary distance becomes closer to the third distance shorter than the reference value of the interpupillary distance. The processing device 110 then shifts to step SA480.

In step SA480, the processing device 110 generates projection image data representing the projection image G including the input image I and ends the image generation processing.

As the image generation processing ends, the processing shifts to step SA500. In step SA500, the processing device 110 functions as the image output unit 115. In step SA500, the processing device 110 controls the communication device 120 and thus supplies the projection image data generated in step SA480 to the projector 20. The projector 20 projects the projection image G based on the projection image data supplied from the image supply device 10 onto the screen SC. Thus, the projection image G is displayed in the projection area SCA on the screen SC.

As described above, the display system 1 according to this embodiment can enlarge or reduce the input image I received from the remote display system 2 in consideration of the size of the projection area SCA and can display the projection image G including the enlarged or reduced input image I in the projection area SCA. Therefore, regardless of the size of the projection area SCA, the user U, who is the viewer, can be given an impression that the face of the user V, who is the person included in the input image I, is displayed in life size in the projection area SCA.

2. Modification Examples

The above embodiment can be modified as described below.

(1) In the above embodiment, the program P causing the processing device 110 of the image supply device 10 to execute the display method prominently representing a feature of the present disclosure is stored in advance in the storage device 130 of the image supply device 10. However, the program P may be distributed in the state of being written in a computer-readable recording medium such as a flash ROM or may be distributed by being downloaded via a telecommunications line such as the internet. A general computer can be made to operate according to the program P distributed based on these aspects and thus can execute the display method according to the present disclosure.

(2) Each of the display size acquisition unit 111, the image acquisition unit 112, the face size calculation unit 113, the image generation unit 114, and the image output unit 115 in the above embodiment is a software module. However, at least one of the display size acquisition unit 111, the image acquisition unit 112, the face size calculation unit 113, the image generation unit 114, and the image output unit 115 may be a hardware module such as an electronic circuit.

3. Aspects Grasped from at Least One of Embodiment and Modification Examples The present disclosure is not limited to the above embodiment and modification examples and can be implemented according to various aspects without departing from the spirit and scope of the present disclosure. For example, the present disclosure can be implemented according to the aspects described below. A technical feature in the embodiment corresponding to a technical feature in the aspects described below can be replaced or combined where appropriate in order to solve a part or all of the problems of the present disclosure or in order to achieve a part of all of the effects of the present disclosure. The technical feature can be deleted where appropriate, unless described as essential in the present specification.

According to an aspect of the present disclosure, a display method includes: acquiring the PPI of the projection image G on the screen SC of the projector 20; acquiring the input image I including a person; generating information representing the size of the face of the person included in the input image I, based on the PPI of the projection image G on the screen SC; correcting the input image I in such a way that the size of the face of the person included in the input image I becomes closer to life size in the projection area SCA, based on the information representing the size of the face of the person included in the input image I; generating projection image data representing the projection image G including the input image I; and projecting the projection image G in the projection area SCA, based on the projection image data.

In the display method according to this aspect, the input image I is corrected in such a way that the size of the face of the user V, who is the person included in the input image I, becomes closer to life size in the projection area SCA, based on the PPI of the projection image G on the screen SC and the information representing the size of the face of the person included in the input image I. Therefore, regardless of the size of the projection area SCA of the projector 20, the user U, who is the viewer, can be given an impression that the face of the person is displayed in life size.

According to another aspect, in the display method, generating the information representing the size of the face of the person may include: detecting the position of the left eye EL of the person and the position of the right eye ER of the person from the input image I; and generating a calculated value of the interpupillary distance representing the distance between the position of the left eye EL and the position of the right eye ER, in the projection area SCA, as the information representing the size of the face of the person.

In the display method according to this aspect, the information representing the size of the face of the person can be generated, based on the interpupillary distance, which is the distance between the left eye EL and the right eye ER of the person. Therefore, if the input image I includes at least the left eye EL and the right eye ER of the person, the input image I can be corrected according to the size of the projection area SCA of the projector 20.

According to another aspect, in the display method, correcting the input image I may include: reducing the input image I in such a way that the calculated value of the interpupillary distance becomes closer to the reference value of the interpupillary distance, when the calculated value of the interpupillary distance is equal to or greater than the first threshold; and enlarging the input image I in such a way that the calculated value of the interpupillary distance becomes closer to the reference value of the interpupillary distance, when the calculated value of the interpupillary distance is equal to or smaller than the second threshold.

In the display method according to this aspect, the calculated value of the interpupillary distance, which is the distance between the left eye EL and the right eye ER of the person included in the input image I, is corrected in such a way as to become closer to the reference value of the interpupillary distance representing the interpupillary distance of the person in life size. Therefore, the user U, who is the viewer, can be given an impression that the face of the person displayed in the projection area SCA is displayed in life size.

According to another aspect, in the display method, correcting the input image I may include: enlarging the input image I in such a way that the calculated value of the interpupillary distance becomes closer to the reference value of the interpupillary distance, when the size of the projection area SCA is equal to or greater than the third threshold representing a size that can display the face of the person in life size and the calculated value of the interpupillary distance is equal to or smaller than the second threshold; and enlarging the input image I in such a way that the calculated value of the interpupillary distance becomes closer to the third distance shorter than the reference value of the interpupillary distance, when the size of the projection area SCA is smaller than the third threshold and the calculated value of the interpupillary distance is equal to or smaller than the second threshold.

In the display method according to this aspect, the calculated value of the interpupillary distance of the person included in the input image I is corrected in such a way as to become closer to the third distance shorter than the reference value of the interpupillary distance, when the projection area SCA of the projector 20 is not an enough size to display the face of the person in life size. Therefore, the projection image G enlarged excessively in relation to the size of the projection area SCA can be prevented from being displayed.

According to another aspect, in the display method, correcting the input image I may include enlarging the input image I in such a way that the calculated value of the interpupillary distance becomes closer to the reference value of the interpupillary distance, when the size of the projection area SCA is equal to or greater than the third threshold representing a size that can display the face of the person in life size and the calculated value of the interpupillary distance is equal to or smaller than the second threshold. When the size of the projection area SCA is smaller than the third threshold and the calculated value of the interpupillary distance is equal to or smaller than the second threshold, the correction based on the information representing the size of the face of the person may not be made to the input image I.

In the display method according to this aspect, the correction of the input image I is not performed when the projection area SCA of the projector 20 is not an enough size to display the face of the person in life size. Therefore, the projection image G enlarged excessively in relation to the size of the projection area SCA can be prevented from being displayed.

According to another aspect, in the display method, the projector 20 may project the projection image G in the projection area SCA, and acquiring the PPI of the projection image G on the screen SC may include: acquiring a picked-up image formed by picking up a pattern image projected by the projector 20, with the camera 30 whose positional relationship with the projector 20 is known; calculating three-dimensional coordinate values at which the projection area SCA is located, based on the positional relationship and the picked-up image; and acquiring the PPI of the projection image G on the screen SC, which is the information representing the size of the projection area SCA, based on the three-dimensional coordinate values at which the projection area SCA is located.

In the display method according to this aspect, when the projector 20 is used as the display device, the PPI of the projection image G on the screen SC can be acquired by using the projector 20 and the camera 30. Therefore, regardless of the size of the projection area SCA of the projector 20, the user U, who is the viewer, can be given an impression that the face of the person is displayed in life size.

The display system 1 according to an aspect of the present disclosure has the processing device 110 generating projection image data representing the projection image G, and the projector 20 displaying the projection image G in the projection area SCA, based on the projection image data. The processing device 110 executes: acquiring the PPI of the projection image G on the screen SC; acquiring the input image I including a person; generating information representing the size of the face of the person included in the input image I, based on the PPI of the projection image G on the screen SC; correcting the input image I in such a way that the size of the face of the person included in the input image I becomes closer to life size in the projection area SCA, based on the information representing the size of the face of the person; and generating the projection image data representing the projection image G including the input image I.

In the display system 1 according to this aspect, the input image I is corrected in such a way that the size of the face of the user V, who is the person included in the input image I, becomes closer to life size in the projection area SCA, based on the PPI of the projection image G on the screen SC and the information representing the size of the face of the person included in the input image I. Therefore, regardless of the size of the projection area SCA of the projector 20, the user U, who is the viewer, can be given an impression that the face of the person is displayed in life size.

What is claimed is:

1. A display method comprising:
   acquiring information representing a size of a display area of a display device;
   acquiring an input image including a person;
   generating information representing a size of a face of the person included in the input image, based on the information representing the size of the display area;
   correcting the input image in such a way that the size of the face of the person included in the input image becomes closer to life size in the display area, based on the information representing the size of the face of the person;
   generating first image data representing a first image including the input image; and
   displaying the first image in the display area, based on the first image data, wherein
   generating the information representing the size of the face of the person includes:
      detecting a first position representing a position of a left eye of the person and a second position representing a position of a right eye of the person, from the input image; and
      generating a first distance representing a distance between the first position and the second position in the display area, as the information representing the size of the face of the person, and
   correcting the input image includes:
      reducing the input image in such a way that the first distance becomes closer to a second distance representing a reference value, when the first distance is equal to or longer than a first threshold; and
      enlarging the input image in such a way that the first distance becomes closer to the second distance, when the first distance is equal to or shorter than a second threshold.

2. The display method according to claim 1, wherein correcting the input image includes:
   enlarging the input image in such a way that the first distance becomes closer to a second distance representing a reference value, when the size of the display area is equal to or greater than a third threshold representing a size that can display the face of the person in life size and the first distance is equal to or shorter than a second threshold; and
   enlarging the input image in such a way that the first distance becomes closer to a third distance shorter than the second distance, when the size of the display area is smaller than the third threshold and the first distance is equal to or shorter than the second threshold.

3. The display method according to claim 1, wherein correcting the input image includes
   enlarging the input image in such a way that the first distance becomes closer to a second distance representing a reference value, when the size of the display area is equal to or greater than a third threshold representing a size that can display the face of the person in life size and the first distance is equal to or shorter than a second threshold, and
   correcting the input image based on the information representing the size of the face of the person is not performed, when the size of the display area is smaller than the third threshold and the first distance is equal to or shorter than the second threshold.

4. The display method according to claim 1, wherein the display device is a projector projecting the first image in the display area, and
   acquiring the information representing the size of the display area includes:
      acquiring a picked-up image formed by picking up an image for measurement projected by the projector, with a camera whose positional relationship with the projector is known;
      calculating three-dimensional coordinate values at which the display area is located, based on the positional relationship and the picked-up image; and
      acquiring the information representing the size of the display area, based on the three-dimensional coordinate values at which the display area is located.

5. A display system comprising:
   a processing device generating first image data representing a first image; and
   a display device displaying the first image in a display area, based on the first image data, wherein
   the processing device is configured to:
      acquire information representing a size of the display area;
      acquire an input image including a person;

generate information representing a size of a face of the person included in the input image, based on the information representing the size of the display area, including:
  detecting a first position representing a position of a left eye of the person and a second position representing a position of a right eye of the person, from the input image, and
  generating a first distance representing a distance between the first position and the second position in the display area, as the information representing the size of the face of the person;
correct the input image in such a way that the size of the face of the person included in the input image becomes closer to life size in the display area, based on the information representing the size of the face of the person, including:
  reducing the input image in such a way that the first distance becomes closer to a second distance representing a reference value, when the first distance is equal to or longer than a first threshold, and
  enlarging the input image in such a way that the first distance becomes closer to the second distance, when the first distance is equal to or shorter than a second threshold; and
generate the first image data representing the first image including the input image.

6. A display method comprising:
acquiring information representing a size of a display area of a display device;
acquiring an input image including a person;
generating information representing a size of a face of the person included in the input image, based on the information representing the size of the display area;
correcting the input image in such a way that the size of the face of the person included in the input image becomes closer to life size in the display area, based on the information representing the size of the face of the person;
generating first image data representing a first image including the input image; and
displaying the first image in the display area, based on the first image data, wherein
the display device is a projector projecting the first image in the display area, and
acquiring the information representing the size of the display area includes:
  acquiring a picked-up image formed by picking up an image for measurement projected by the projector, with a camera whose positional relationship with the projector is known;
  calculating three-dimensional coordinate values at which the display area is located, based on the positional relationship and the picked-up image; and
  acquiring the information representing the size of the display area, based on the three-dimensional coordinate values at which the display area is located.

* * * * *